United States Patent
Fukuhara et al.

(10) Patent No.: US 6,876,772 B2
(45) Date of Patent: Apr. 5, 2005

(54) PICTURE-ENCODING APPARATUS AND PICTURE-ENCODING METHOD

(75) Inventors: Takahiro Fukuhara, Kanagawa (JP); Seiji Kimura, Chiba (JP)

(73) Assignee: Sony Corporation (JP)

( * ) Notice: Subject to any disclaimer, the term of this patent is extended or adjusted under 35 U.S.C. 154(b) by 526 days.

(21) Appl. No.: 09/991,729

(22) Filed: Nov. 26, 2001

(65) Prior Publication Data

US 2002/0064232 A1 May 30, 2002

(30) Foreign Application Priority Data

Nov. 27, 2000 (JP) .................................. P2000-359741

(51) Int. Cl.[7] .................................................. G06K 9/46
(52) U.S. Cl. ...................... 382/240; 382/243; 382/244; 382/248; 382/252; 341/94; 341/95; 375/240.11; 375/240.18
(58) Field of Search ................................. 382/240, 243, 382/244, 252, 275; 341/61, 67, 94, 95; 375/240.03, 240.11, 240.18, 240.27

(56) References Cited

U.S. PATENT DOCUMENTS

| | | | | |
|---|---|---|---|---|
| 5,798,794 A | * | 8/1998 | Takahashi | 375/240.11 |
| 5,825,935 A | * | 10/1998 | Murakoshi | 382/248 |
| 6,125,143 A | * | 9/2000 | Suzuki et al. | 375/240.11 |
| 6,229,926 B1 | * | 5/2001 | Chui et al. | 382/240 |
| 6,477,280 B1 | * | 11/2002 | Malvar | 382/245 |
| 6,560,369 B1 | * | 5/2003 | Sato | 382/239 |

* cited by examiner

Primary Examiner—Yon J. Couso
Assistant Examiner—Yosef Kassa
(74) Attorney, Agent, or Firm—Rader, Fishman & Grauer PLLC; Ronald P. Kananen

(57) ABSTRACT

A picture-encoding apparatus provided by the present invention includes a wavelet transformation unit for carrying out wavelet transformation on an input picture to generate wavelet-transformation coefficients, a bit-plane encoding-pass-generating unit for spreading the wavelet-transformation coefficients over bit-planes, an arithmetic encoding unit for carrying out an arithmetic encoding process in an encoding pass, a rate control unit for controlling an encoded-data quantity of the generated arithmetic code so as to achieve a target encoded-data quantity, a header-generating unit for generating a header, a packet-generating unit for generating a packet by addition of the header to the arithmetic code experiencing control of the encoded-data quantity executed by the rate control unit, and an encoded-code-stream-truncating means for truncating an encoded-code stream completing processing through all the encoding passes by discarding a rear portion of the stream so as to make an encoded-data quantity of the stream equal to a target encoded-data quantity.

23 Claims, 14 Drawing Sheets

NUMBER OF DIVISION LEVELS = 2
(H : HIGH BAND, L : LOW BAND)

LOSSLESS

TYPE A

TYPE B

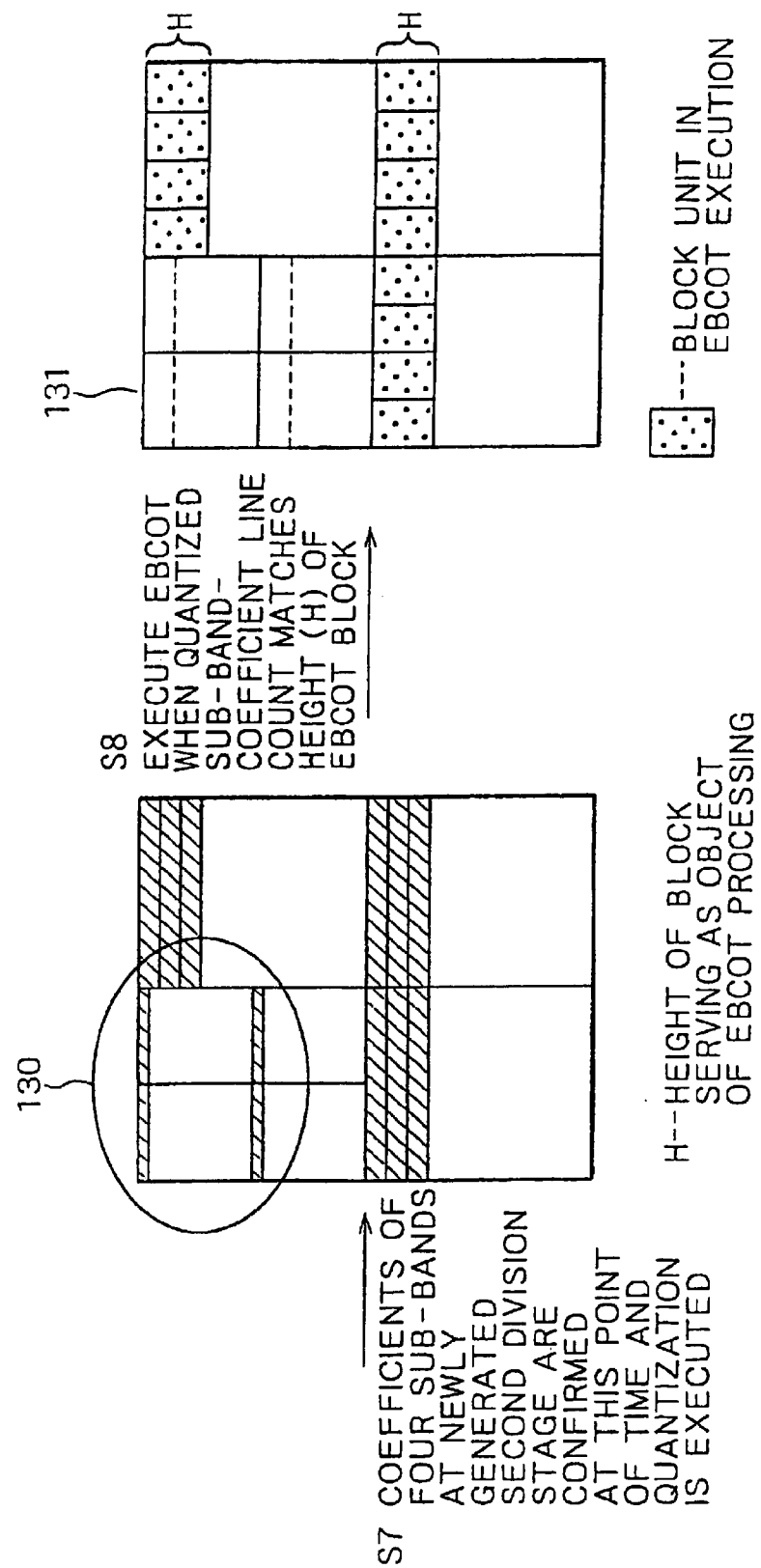

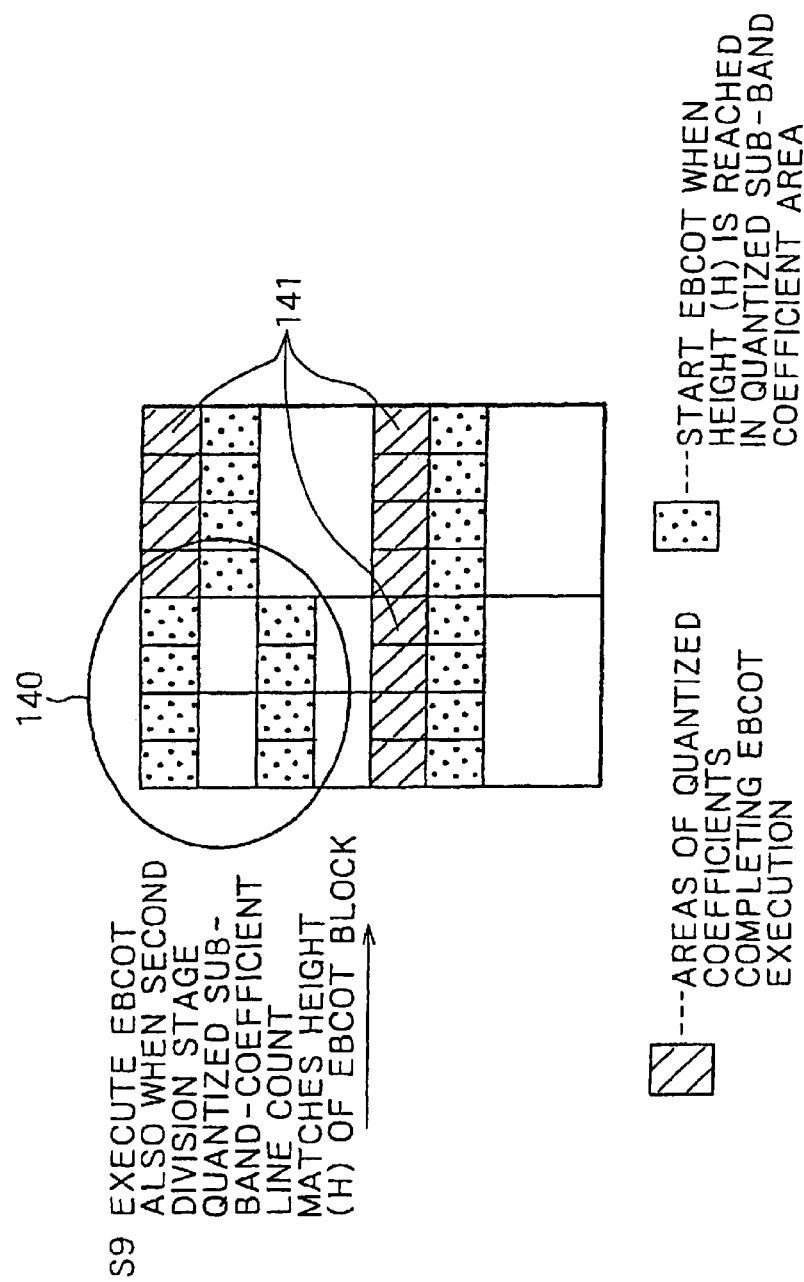

PICTURE-ENCODING APPARATUS AND PICTURE-ENCODING METHOD

BACKGROUND OF THE INVENTION

The present invention relates to a picture-encoding apparatus and a picture-encoding method, which are used for encoding data in accordance with a format conforming to JPEG (Joint Photographic Experts Group)-2000 standard. The picture-encoding apparatus and the picture-encoding method are mainly applied to fields including a static-picture and moving-picture digital cameras, a cam-coder, a monitoring codec, a codec for broadcasting video equipment, a codec of a non-linear editor, a codec embedded in a PDA (Personal Digital Assistance) or embedded in a hand phone, an authoring tool running on a PC (Personal Computer), picture-editing software, a game machine and a compressor of a texture used in a three-dimensional CG (Computer Graphic) or its software module.

As a representative conventional picture compression technology, there has been made available a JPEG system standardized by an ISO (International Organization for Standardization). The JPEG system is known as a method for producing a good encoded/decoded picture by applying a DCT (Discrete Cosine Transform) technique for a case in which a relatively large number of bits are allocated. As the number of encoded bits is reduced to a certain degree, however, block distortion inherent in the DCT technique becomes prominent, making deterioration subjectively striking.

Separately from the JPEG system, there has been conducted many studies of encoding systems wherein a picture is divided by using the so-called filter bank into a plurality of bands and an encoding process is carried out for each of the bands. The filter bank is a combination of high-pass and low-pass filters. One of the encoding systems being studied is a wavelet encoding technique which is much regarded as a new technology replacing the DCT technique due to the fact that the wavelet encoding technique does not have a shortcoming of striking block distortion due to high compression as encountered as a problem in the DCT technique.

In accordance with the JPEG-2000 standard with its completion scheduled for December 2000, this wavelet transformation method adopts a means combining highly efficient entropy encoding technique and an arithmetic encoding technique. This means offers a much improved encoding efficiency in comparison with the JPEG technique. However, these international standards prescribe specifications on the decoder side only, hence allowing free designs on the encoder side. On the other side of the coin, there are neither specifications prescribing a means for reducing the amount of processing carried out by the encoder, which generally bears a heavy load, nor specifications prescribing effective means for rate control described in the specification of the present invention. For this reason, the establishment of such know-how is more important than anything. In addition, with the JPEG technique, rate control for realizing a target compression rate is difficult to execute. In many cases, it is necessary to carry out an encoding process a number of times till a target value is achieved. Since execution of an encoding process a number of times entails a long processing time, it becomes desirable to achieve a target encoded-data quantity by carrying out an encoding process only once.

SUMMARY OF THE INVENTION

It is thus an object of the present invention addressing the problems described above to provide a picture-encoding apparatus and a picture-encoding method, which are used for carrying out an encoding process according to a format conforming to the JPEG-2000 standard to achieve the following purposes.

In the first place, achieve a target encoded-data quantity by carrying out the encoding process only once.

In the second place, implement encoded-data quantity control entailing small computation load and small storage load at the time of rate control as well as offering a high encoding efficiency.

In the third place, be capable of executing stable encoded-data quantity control for not only a static picture, but also a moving picture.

In the fourth place, be capable of executing stable encoded-data quantity control for various kinds of moving picture.

In order to solve the problems described above, the present invention provides a picture-encoding apparatus and a picture-encoding method, which are used for carrying out an encoding process according to a format conforming to the JPEG-2000 standard. In particular, the picture-encoding apparatus includes:

a filtering means for implementing wavelet transformation to generate wavelet-transformation coefficients;

a bit-plane-generating means for spreading the wavelet-transformation coefficients over bit-planes ranging from an MSB (most significant bit) bit-plane to an LSB (least significant bit) bit-plane;

an encoding-pass-generating means for generating an encoding pass for each bit-plane;

an arithmetic encoding unit for carrying out an arithmetic encoding process in the encoding pass;

an encoded-data-quantity control means for controlling an encoded-data quantity so as to achieve a target encoded-data quantity for a generated arithmetic code; and a packet-generating unit for generating a packet by addition of a header to the arithmetic code experiencing control of the encoded-data quantity executed by the encoded-data quantity control means.

The picture-encoding apparatus for carrying out an encoding process according to a format conforming to the JPEG-2000 standard includes either one of the following three means:

A first means is an encoded-code-stream-truncating means for generating an encoded code stream by processing all the encoding passes and then truncating a back portion of the encoded code stream so as to achieve a target encoded-data quantity.

A second means is an encoding-process-stopping means, which is used for halting an encoding process at a point of time the encoding-pass-generating means achieves a target encoded-data quantity set in advance.

A third means includes storage means for storing the number of encoding passes in advance for each sub-band generated by the filtering means and an encoding-pass-ending means, which is used for ending generation of encoding passes when the number of ending passes is achieved.

The present invention has the following functions.

In the picture-encoding apparatus and the picture-encoding method, which are used for carrying out an encoding process according to a format conforming to the JPEG-2000 standard, the filtering means for carrying out wavelet transformation performs filtering on an input picture by using a filter bank to find a transformation coefficient. The filter bank comprises low-pass and high-pass filters. In particular, the filtering means has a function to transform a low-frequency sub-band recursively till sub-bands at a plurality of division stages are obtained. A quantization means carries out scalar quantization. That is to say, the quantization means has a function to divide a transformation coefficient value by a predetermined quantization step size. The encoding-pass-generating means for generating an encoding pass for each bit-plane has a function to generate bit-planes ranging from an MSB (most significant bit) bit-plane to an LSB (least significant bit) bit-plane for spreading transformation coefficients within a predetermined encoding block unit and a function to process the encoding pass. Called from an encoding pass, the arithmetic encoding unit has functions to measure statistics and carry out an arithmetic encoding process while performing a learning process. In the encoded-data quantity control means for controlling the encoded-data quantity of a generated arithmetic code so as to achieve a target encoded-data quantity, the encoded-code-stream-truncating means truncates a portion of an encoding pass so as to achieve an encoded-data quantity approaching the target encoded-data quantity.

As described above, in accordance with the present invention, it is possible to implement a picture-encoding apparatus and a picture-encoding method, which are used for generating an encoded-code stream conforming to the JPEG-2000 standard. In addition, it is also possible to exhibit an effect of efficiently implementing an encoded-data-quantity control means, which was not given much attention so far due to its inconformity with the conventional standards.

Moreover, there is also exhibited an effect of high-speed encoding due to an effect of reduction of a computation load borne during control of the encoded-data quantity in comparison with a means, which takes a rate distortion characteristic into consideration. As a result, the present invention has an effect of a capability of encoding more moving-picture frames per unit time.

Furthermore, since the present invention also provides a means for referring to encoding-pass tables each used for storing a maximum encoding-pass count for each sub-band, there is exhibited an effect of all-time accurate control even for a moving picture with brisk motions due to proper selection of an encoding-pass table. In addition, the present invention also has an effect of providing a high picture quality not inferior to a means, which takes a rate distortion characteristic into consideration.

BRIEF DESCRIPTION OF THE DRAWINGS

FIG. 5A shows wavelet-transformation coefficients;

FIG. 5B shows bit-planes, on which the absolute values of the wavelet-transformation coefficients are spread; and FIG. 5C shows a bit-plane, on which the signs of the wavelet-transformation coefficients are spread;

FIG. 13 is a diagram showing Part III of the wavelet-transformation processing; and FIG. 14 is a diagram showing Part IV of the wavelet-transformation processing.

DETAILED DESCRIPTION OF THE PREFERRED EMBODIMENTS

The following description explains a picture-encoding apparatus and picture-encoding method of the present invention, which are used for carrying out an encoding process according to a format conforming to the JPEG-2000 standard.

First Embodiment

Figure 1:
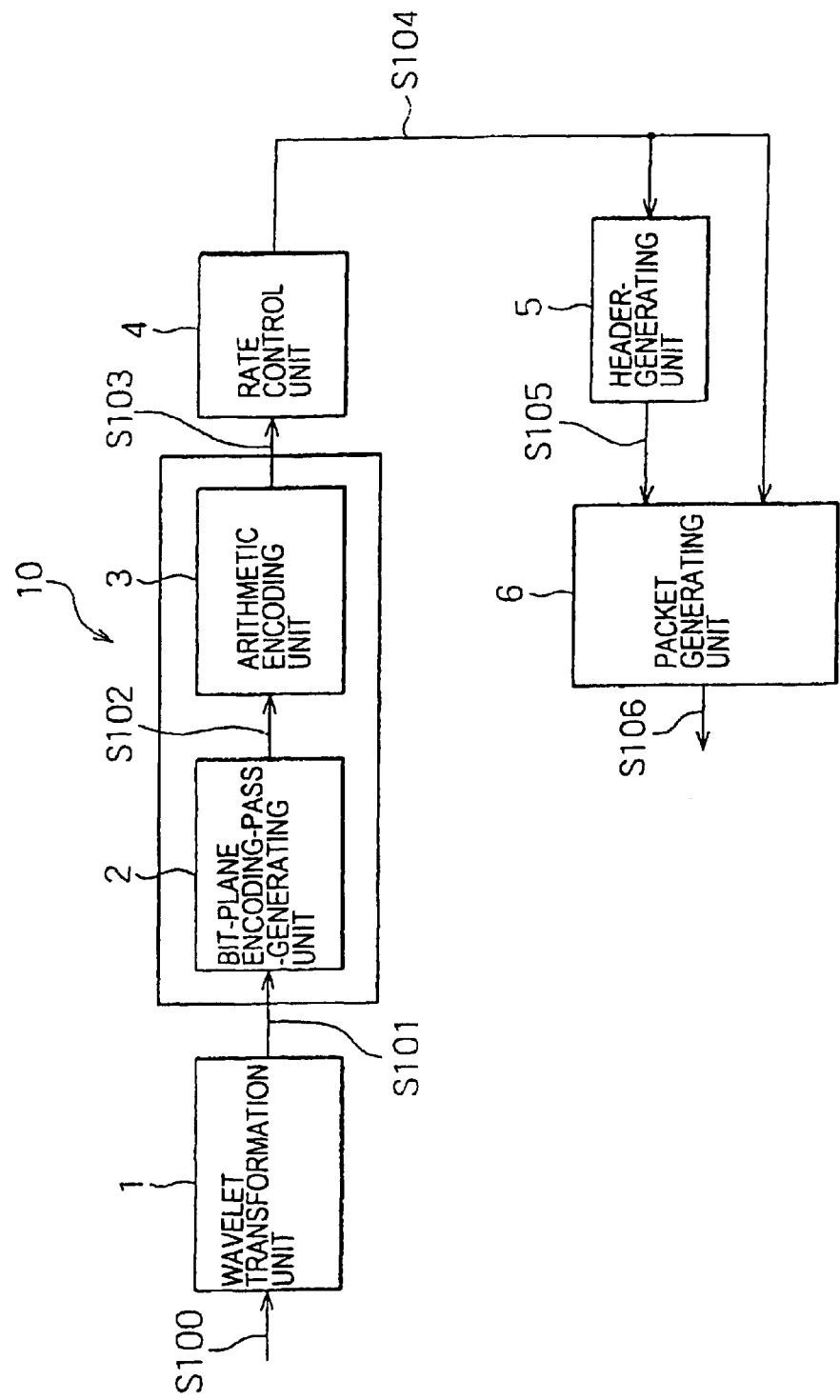
FIG. 1 is a block diagram showing the configuration of a picture-encoding apparatus implemented by an embodiment of the present invention.

FIG. 1 is a block diagram showing the configuration of a picture-encoding apparatus implemented by an embodiment of the present invention. As shown in the figure, the picture-encoding apparatus includes:

a wavelet transformation unit 1 for carrying out wavelet transformation on an input picture to generate wavelet-transformation coefficients;

a bit-plane encoding-pass-generating unit 2 for spreading the wavelet-transformation coefficients over bit-planes ranging from an MSB (most significant bit) bit-plane to an LSB (least significant bit) bit-plane;

an arithmetic encoding unit 3 for carrying out an arithmetic encoding process in an encoding pass to generate arithmetic code;

a rate control unit 4 for controlling an encoded-data quantity so as to achieve a target encoded-data quantity for the generated arithmetic code;

a header-generating unit 5 for generating a header; and a packet-generating unit 6 for generating a packet by addition of the header to the arithmetic code experiencing control of the encoded-data quantity executed by the rate control unit 4.

The bit-plane encoding-pass-generating unit 2 and the arithmetic encoding unit 3 constitute an EBCOT (Embedded Coding with Optimized Truncation) Encoding Unit 10.

Next, the operation of the picture-encoding apparatus implemented by the embodiment is explained. In the wavelet transformation unit 1, wavelet transformation is carried out by a filter bank comprising ordinary low-pass and high-pass filters. Since such a digital filter normally has a plurality of filter coefficients, that is, since a digital filter normally exhibits a plurality of tap-length impulse responses, it is necessary to buffer as many filterable input pictures as possible in advance by using a buffering means. In this embodiment, however, such a buffering means is removed from the configuration shown in FIG. 1.

Figure 4:
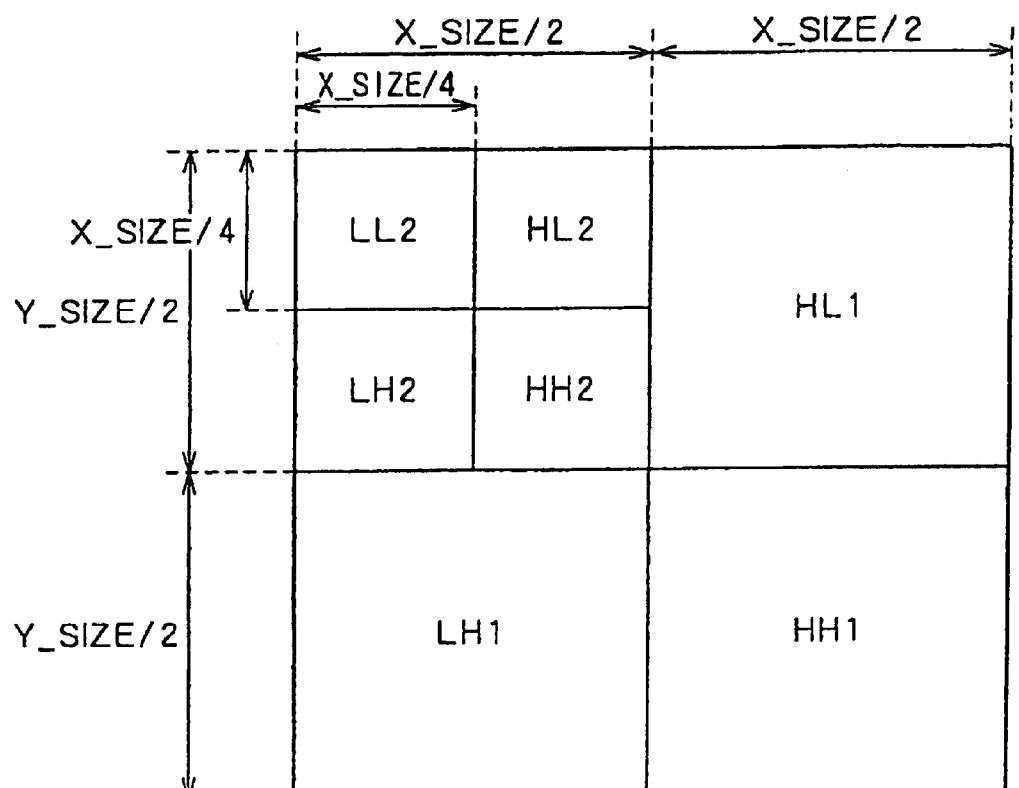
FIG. 4 is a diagram showing sub-bands obtained as a result of wavelet division up to second stage.

Since no buffering means is provided, the wavelet transformation unit 1 receiving a minimum picture S100 required in a filtering process carries out the filtering process by performing wavelet transformation to generate wavelet-transformation coefficients S101. FIG. 4 is a diagram showing sub-bands obtained as a result of wavelet division up to the second stage. It should be noted that the wavelet transformation normally adopts a means for retransforming a lowest band portion LL1 at the first division stage into four sub-bands at the second division stage, namely a lowest band sub-band LL2, a low high band sub-band LH2, a high low band sub-band HL2 and a highest band sub-band HH2 as shown in FIG. 4. This is because most energy of a picture is concentrated on the lowest band portion.

It is worth noting that, in the case of the example shown in FIG. 4, the wavelet transformation has two levels of division-stage. As a result, the wavelet transformation generates a total of seven division bands. The seven division bands are three bands at the first division stage, namely, a low high band portion LH1, a high low band portion HL1 and a highest band portion HH1 in addition to the four sub-bands at the second division stage, namely, the lowest band sub-band LL2, the low high band sub-band LH2, the high low band sub-band HL2 and the highest band sub-band HH2 which are cited above. Note that, while the wavelet transformation means applies a recursive filtering process to only a lowest band portion, it is needless to say that other means are also available as well.

Then, the wavelet-transformation coefficient is supplied to the bit-plane encoding-pass-generating unit 2 for carrying out an entropy encoding process. In particular, this embodiment is exemplified by taking an entropy coding process called an EBCOT (Embedded Coding with Optimized Truncation) as an example. The EBCOT is an encoding process prescribed by the JPEG-2000 standard. For details of the EBCOT, refer to the following reference: ISI/IEC FDIS 15444-1, JPEG-2000, Part 1 FDIS, 18 Aug. 2000.

Figures 5A, 5B, 5C:
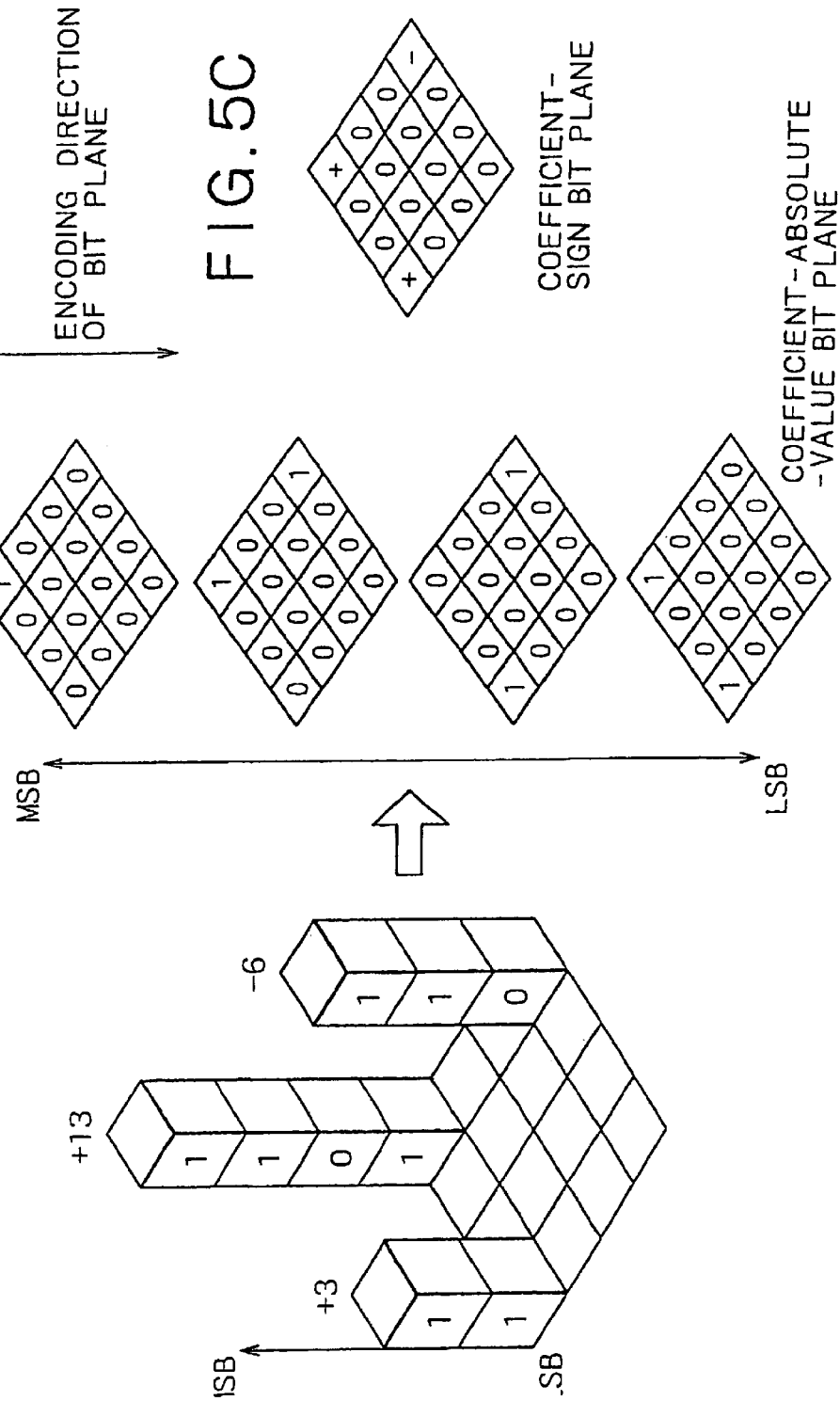
FIGS. 5A through 5C are explanatory diagrams used for describing a bit-plane.

Prior to explanation of the EBCOT, the concept of a bit-plane is described by referring to FIG. 5. FIG. 5A is a diagram showing a quantization-coefficient square having four-coefficient sides to give an area corresponding to a total of sixteen quantization coefficients. Among the quantization coefficients, there is one having a maximum absolute value of 13, which is expressed by a binary representation of 1101. The values of the quantization coefficients are the values of the wavelet-transformation coefficients S101.

The EBCOT encoding process generates four types of absolute-value bit-plane shown in FIG. 5B and a sign bit-plane shown in FIG. 5C. An absolute-value bit-plane is a slice consisting of a bit of the absolute value of each quantization coefficient. Since the value of a quantization coefficient is the value of a wavelet-transformation coefficient S101, which consists of four bits, there are four types of absolute-value bit-plane. The lowermost absolute-value bit-plane or the so-called LSB bit-plane consists of the least significant bit (LSB) of the absolute value of each quantization coefficient whereas the uppermost absolute-value bit-plane or the so-called MSB bit-plane consists of the most significant bit (MSB) of the absolute value of each quantization coefficient. Since there are sixteen quantization coefficients, each of the absolute-value bit-planes consists of sixteen bits, which each have a value of either '1' or '0' corresponding to the binary value of the counterpart bit in the quantization coefficient. The sign bit-plane consists of sixteen bits each representing the sign '+' or '−' of a quantization coefficient.

As described above, there are four absolute-value bit-planes as shown in FIG. 5B. It is also obvious that each of the absolute-value bit-planes consists of 16 bits, which each have a value of either '1' or '0'. By the way, the sixteen quantization coefficients shown in FIG. 5A are all 0 or positive, except one, which has a negative value of −6. Thus, the sixteen bits of the sign bit-plane have values shown in FIG. 5C.

The EBCOT encoding process is a means for encoding data for each block having a predetermined size while measuring statistics of coefficients inside the block. Quantization coefficients are subjected to an entropy encoding process in block units each having a predetermined size. The block unit is referred to as a code block. A code block is encoded in bit-plane units independently of each other in a direction from an MSB bit-plane to an LSB bit-plane. The width and the height of a code block are each the square of a number. The square of a number shall have a value in the range 4 to 256. Typical dimensions of a code block that are normally used include 32×32, 64×64 and 128×32. The value of a coefficient in a wavelet area is expressed by a signed binary representation consisting of n bits, namely, bit 0 to bit (n-1). Bit 0 and bits (n-2) are the LSB and the MSB respectively whereas bit (n-1) is the sign bit. As described above, a code block is encoded in bit-plane units starting with the MSB bit-plane in accordance with the following three types of encoding pass.

For the EBCOT encoding process carried out as a technique of encoding coefficient values on an absolute-value bit-plane, there are prescribed three types of encoding pass, namely, a significance propagation pass, a magnitude refinement pass and a cleanup pass.

Figure 6:
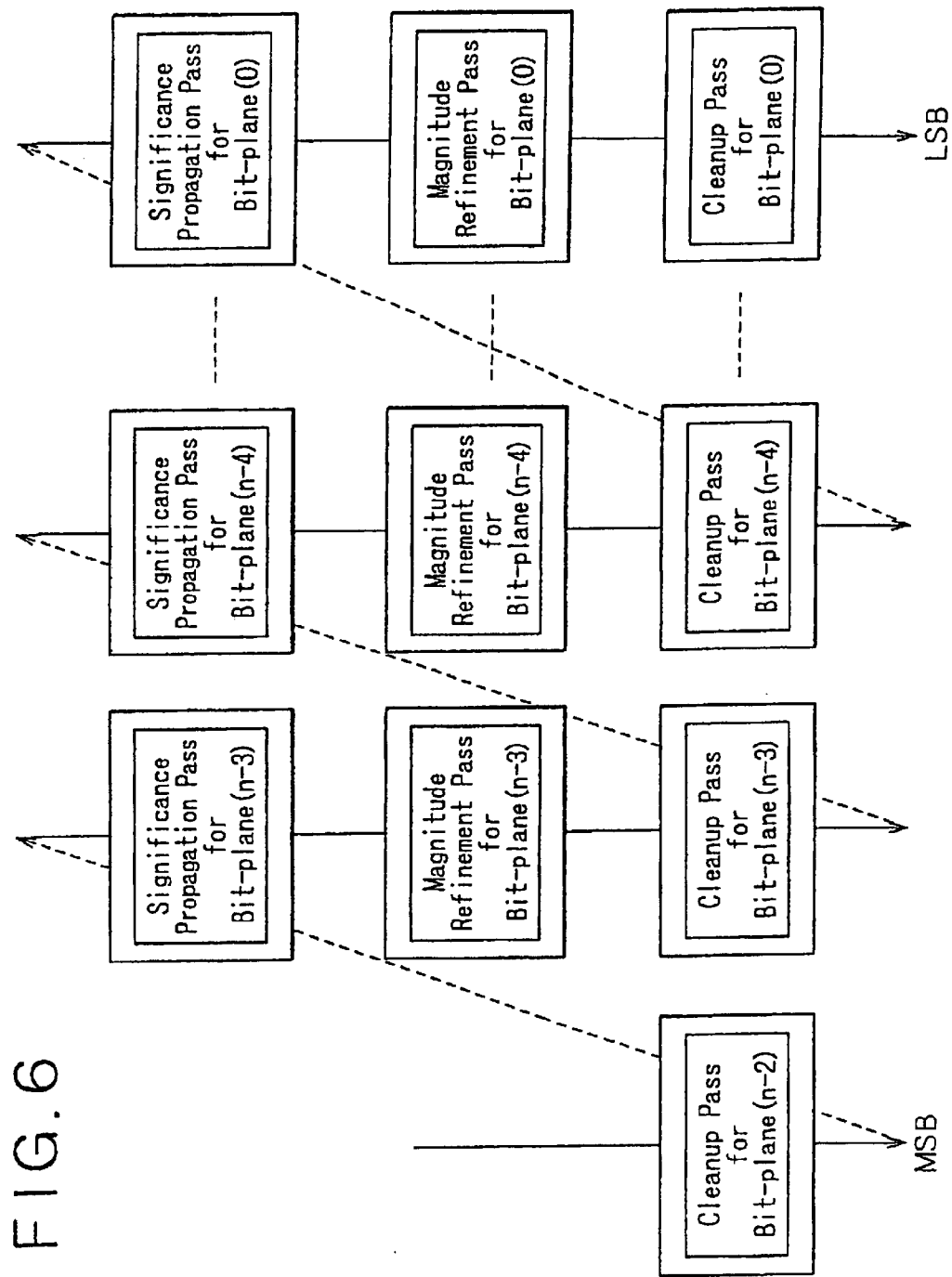
FIG. 6 is a diagram showing a procedure for processing through encoding passes according to JPEG-2000 standard.

An order in which the three encoding passes are used is shown in FIG. 6. As shown in FIG. 6, a bit-plane (n-2) on the MSB side is encoded in accordance with the cleanup pass. The encoding process of the bit-plane (n-2) is followed by encoding processes of bit-planes (n-3), (n-4) and so on and ended with an encoding process of a bit-plane (0) on the LSB side. However, the encoding process of each of subsequent bit-planes are carried out in accordance with the three encoding passes, namely, the significance propagation pass, the magnitude refinement pass and the cleanup pass in the order the passes are enumerated.

In actuality, however, the above encoding processes start with a first bit-plane found in a search in the direction from the MSB side to the LSB side to include a bit with a value of '1'. Information on such a first bit-plane is recorded in a header. That is to say, a bit-plane consisting of all '0' bits is not encoded.

While the encoding process is being carried out by following the three types of encoding pass repeatedly in the order described above, rate control is executed by terminating the process at such an encoding pass of such a bit-plane that a good trade-off is established between the encoded-data quantity and the picture quality.

Figure 7:
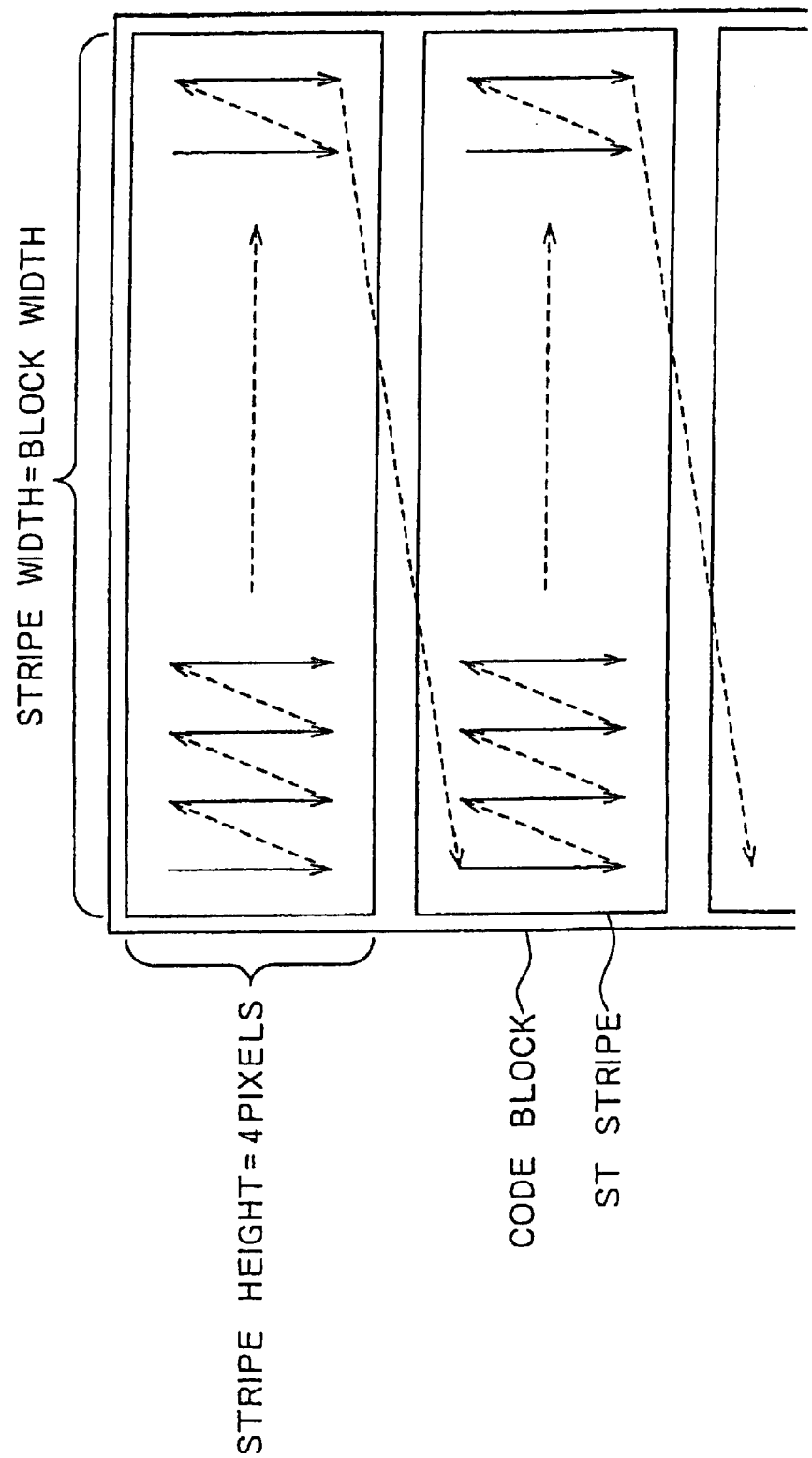
FIG. 7 is a diagram showing a scanning path in a code block.

Next, an operation to scan coefficients is explained by referring to FIG. 7. In an example shown in FIG. 7, a code block is divided into stripes STs each having a height of four pixels, which are four coefficients. The width of each of the stripes is equal to the width of the code block. Coefficients in the code block are scanned in an order of tracing all the coefficients. To be more specific, the coefficients in the code block are scanned in an order that starts with the top stripe ST, goes down to lower stripes STs sequentially one stripe ST after another and ends with the bottom stripe ST.

Coefficients in each stripe ST are scanned in an order that starts with the leftmost column, goes down to columns in the right sequentially one column after another and ends with the rightmost column. Coefficients on a column are scanned in the top-down order. In each of the encoding passes, all coefficients in a code block are processed in the scanning orders described above.

Next, the three encoding passes are described.

First of all, the significance propagation pass is explained as follows. In the significance propagation pass for encoding a certain bit-plane, the value of the bit-plane of non-significant coefficient whose at least one of eight surrounding bits is significant is subjected to an arithmetic encoding process. If the value of the bit-plane subjected to the arithmetic encoding process is 1, the arithmetic encoding process is followed by an arithmetic encoding process as to whether the sign bit is + or −.

The meaning of the word 'significance' used in this specification is explained as follows. The significance is an encoder's state provided for each coefficient. The initial value of the significance is '0' indicating a non-significant bit. When a '1' bit of the coefficient is encoded, the value of the significance changes to '1' indicating a significant bit. Thereafter, the value of the significance is held at '1'. Thus, the significance can be regarded as a flag indicating whether a significant bit of the coefficient has been encoded.

Next, the second encoding pass, namely, the magnitude refinement pass, is explained. The magnitude refinement pass is used for encoding values of a bit-plane of significant coefficient, which are not encoded in the significance propagation pass.

Next, the third encoding pass, namely, the cleanup pass, is explained. The cleanup pass is used for encoding values of a bit-plane of non-significant coefficient, which are not encoded in the significance propagation pass. If the value of the bit-plane of non-significant coefficient is 1, the arithmetic encoding process is followed by an arithmetic encoding process as to whether the sign bit is + or −.

It should be noted that, while statistics are measured for each code-block unit in the arithmetic encoding processes in the three encoding passes described above, the processes may be carried out as ZC (zero coding), RLC (run-length coding), SC (sign coding) and MR (magnitude refinement). In this case, an arithmetic code known as an MQ code is used. An MQ code is a learning-type binary arithmetic code prescribed in JBIG2 standard. For details, refer to the following reference: ISO/IEC FDIS 14492, "Lossy/Lossless Coding of Bi-level Images," March 2000). In accordance with the JPEG-2000 standard, in all encoding passes, there is a total of nineteen types of context.

The description given above exemplifies the bit-plane encoding-pass-generating unit 2 for generating encoding passes for each bit-plane, the arithmetic encoding unit 3 and the means conforming to the JPEG-2000 standard. It should be noted that, in accordance with the embodiment, in the bit-plane encoding-pass-generating unit 2 for generating encoding passes for each bit-plane, an encoding process is carried out independently for each block and statistics of the encoding process are measured in a closed manner within an encoding block as described in claim 9. In the case of the embodiment, the encoding block is a code block.

Next, later-stage processing is explained by referring to FIG. 1. After the processing of all the bit-plane encoding passes has been completed, the rate control unit 4 counts the number of codes in an arithmetic code signal S103 output by the arithmetic encoding unit 3 all the time. At a point of time a target encoded-data quantity is reached, the rate control unit 4 truncates the arithmetic code signal S102 by discarding the remaining arithmetic codes. Since encoding passes of all the bit-planes are processed, the processing load is big. However, the picture-encoding apparatus provided by the present invention adopts an encoded-code-stream-truncating means, which is used for truncating the encoded-code stream before the target encoded-data quantity is exceeded. Thus, the encoded-data quantity can be suppressed with a high degree of reliability so as not to exceed the target encoded-data quantity.

An arithmetic code signal S104 experiencing the encoded-data-quantity control executed by the rate control unit 4 is supplied to the header-generating unit 5 for outputting additional information on internals of a code block on the basis of the arithmetic code signal S104 as a header S105. The additional information includes the number of encoding passes in the code block and a data length of the compressed-data stream. The packet-generating unit 6 generates a packet S106 comprising the arithmetic code signal S104 and header S105 as an output of the picture-encoding apparatus.

Second Embodiment

In the case of the first embodiment, after the processing of all the bit-plane encoding passes has been completed, the encoded-code-stream-truncating means employed in the rate control unit 4 truncates the arithmetic code stream. In order to further reduce the magnitude of the encoding load, the picture-encoding apparatus is provided with an encoding-process-stopping means. While counting the number of encoded codes included in the arithmetic code signal S103 all the time, the encoding-process-stopping means discontinues the encoding process at a point of time the target coded-data quantity is reached. In this case, it is thus necessary to count the number of encoded codes included in the arithmetic code signal S103 all the time and compare the cumulated count with the target coded-data quantity. For this reason, the operation of the rate control unit 4 is more complicated than that of the first embodiment. As described earlier, however, it is not necessary to encode the encoding pass of all the bit-planes. Accordingly, the magnitude of the encoding load can be reduced.

Third Embodiment

Figure 2:
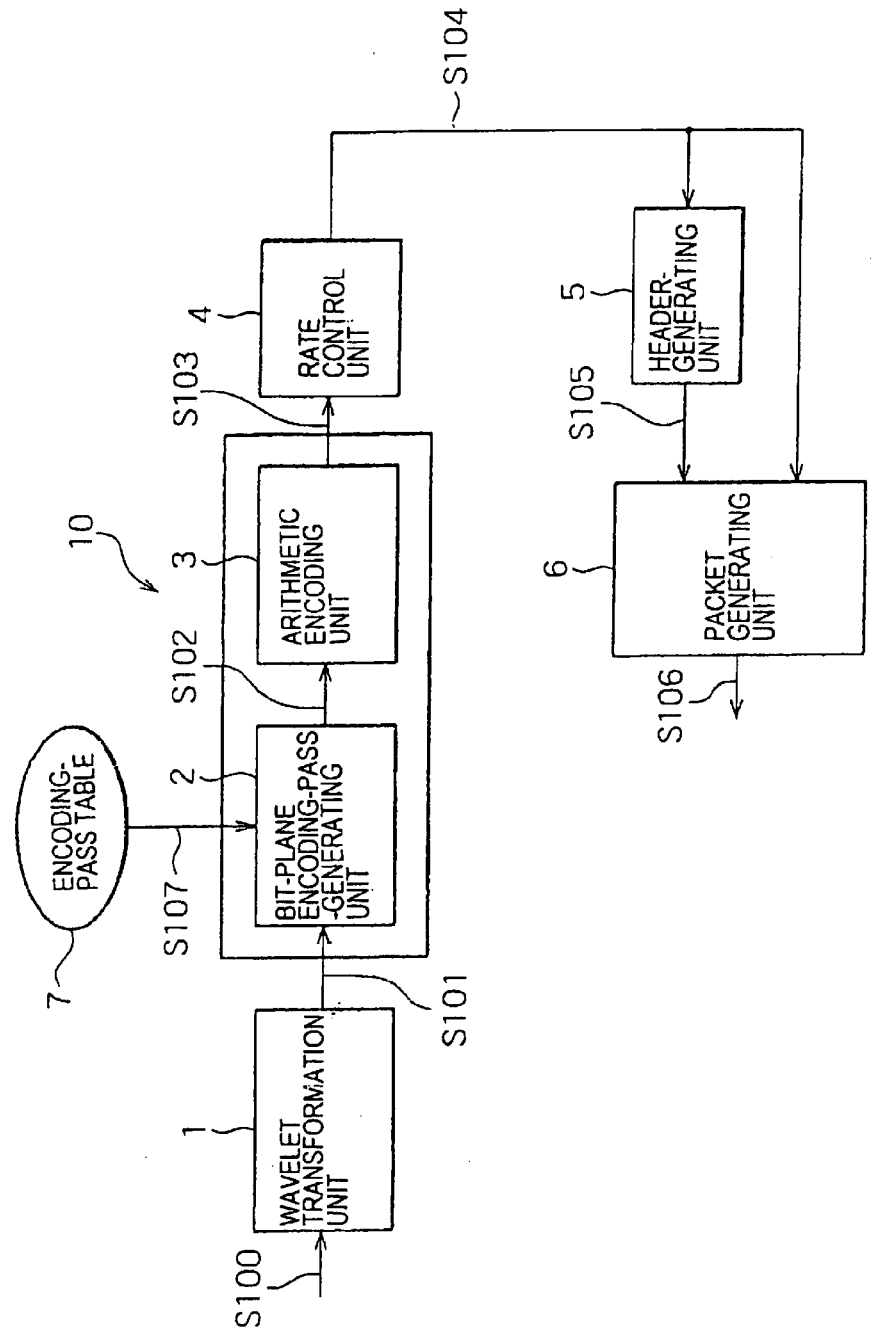
FIG. 2 is a block diagram showing the configuration of a picture-encoding apparatus implemented by another embodiment of the present invention.

FIG. 2 is a block diagram showing the configuration of another picture-encoding apparatus implemented by a third embodiment of the present invention. In addition to the components employed in the first embodiment shown in FIG. 1, this second embodiment also includes an encoding-pass table 7 for storing the number of encoding passes for each sub-band generated as a result of the filtering.

Next, the operation of the second embodiment is explained. As is the case with the first embodiment described earlier, the wavelet-transformation coefficients S101 are spread on bit-planes, and encoding passes are generated for each of the bit-planes. The rate control is then executed to determine which encoding passes are to be selected and which encoding passes are to be truncated to achieve the target encoded-data quantity. Effects on the picture quality vary in dependence on the encoding passes and also vary in dependence on sub-bands in which the encoding passes exist.

It is thus desirable to compute the encoded-data quantity of encoding passes in a code block and the amount of distortion generated as a result of truncation of the encoding passes by using an information theory. It is also desirable to determine which encoding passes are to be truncated and selected so as to give a result that is optimum from the rate-distortion-theoretical point of view. The distortion has something to do with the quality of the picture. In order to implement this control, however, it is necessary to carry out computation entailing a very heavy processing load and provide a large-size memory for storing distortion-amount data. Such control is thus unrealistic.

In order to solve the problem described above, an upper limit is imposed in advance on the number of encoding passes in a code block for each sub-band. In addition, a means is provided and used for forcibly truncating encoding passes in case the number of encoding passes exceeds the upper limit. In this case, it is necessary to determine a maximum value of the number of encoding passes for a bit-plane on which wavelet-transformation coefficients are spread. Such a maximum value can be determined by referring to the encoding-pass table 7 used for storing an upper limit imposed on the number of encoding passes in advance for each sub-band.

Figure 8:
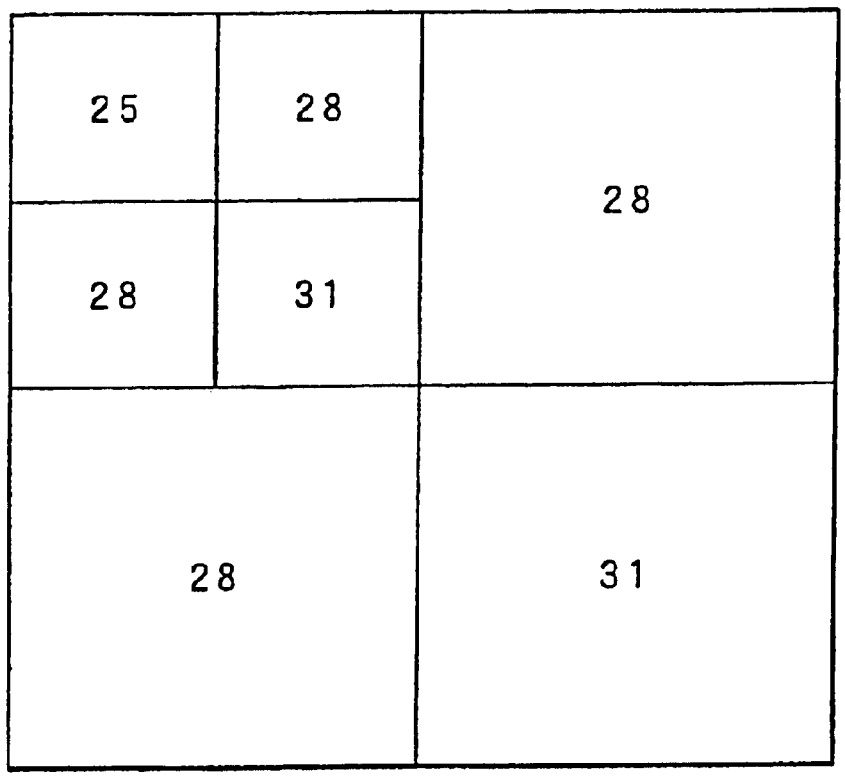
FIG. 8 is a diagram showing upper limits of encoding-pass counts for a lossless encoding process with two wavelet division stages.

FIG. 8 is a diagram showing upper limits of encoding-pass counts assumed for a lossless encoding process or for a case in which encoding passes of all bit-planes are processed.

As shown in the figure, at the second division stage, the maximum value of the number of encoding passes for the lowest band sub-band LL2 is 25, the maximum value of the number of encoding passes for the low high band sub-band LH2 is 28, the maximum value of the number of encoding passes for the high low band sub-band HL2 is 28 and the maximum value of the number of encoding passes for the highest band sub-band HH2 is 31. At the first division stage, on the other hand, the maximum value of the number of encoding passes for the low high sub-band LH1 is 28, the maximum value of the number of encoding passes for the high low sub-band HL1 is 28 and the maximum value of the number of encoding passes for the highest sub-band HH1 is 31.

These values are assumed on the basis of G=2 bits and the use of a reversible-type 5×3 filter for lossless wavelet transformation where notation G denotes a guard-bit count defined in the JPEG-2000 standard whereas the numbers 5 and 3 are each the tap length of the filter. A guard bit is a bit for protection against an overflow. With these values, as a rule, the number of encoding passes cannot exceed the maximum value shown in FIG. 8. For details, refer to the FDIS standard sheet of the JPEG-2000 standard mentioned earlier. In addition, this embodiment assumes that input picture data is 8 bits per component.

Figure 9:
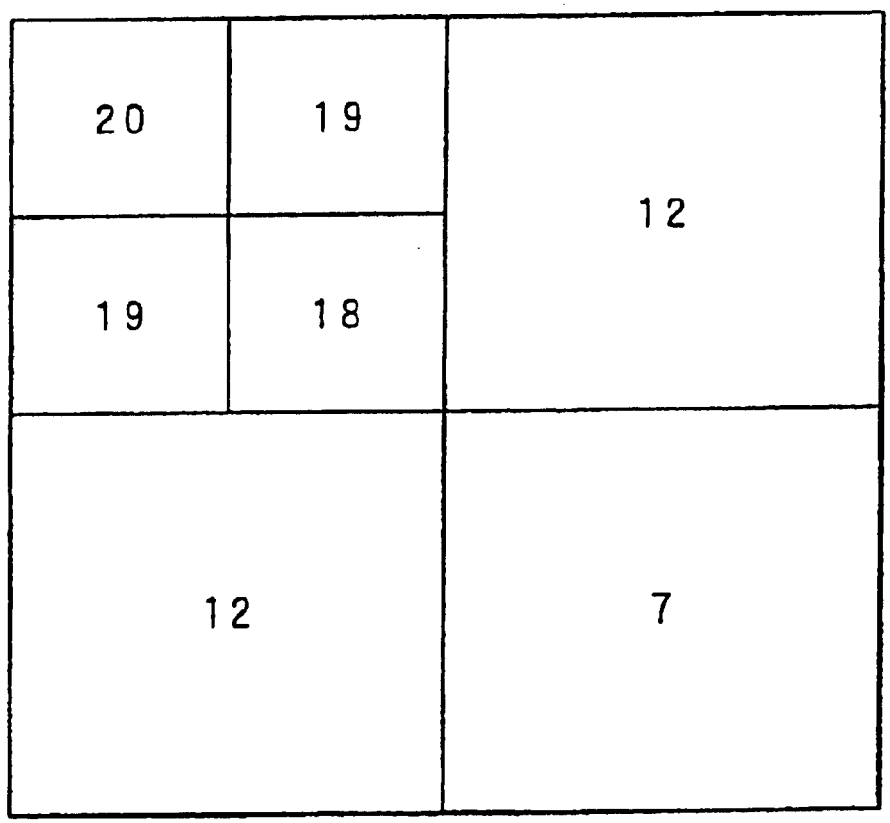
FIG. 9 is a diagram showing upper limits of encoding-pass counts of a certain type with two wavelet division stages.

FIG. 9 is a diagram showing upper limits of encoding-pass counts of type A.

As shown in the figure, at the second division stage, the maximum value of the number of encoding passes for the lowest band sub-band LL2 is 20, the maximum value of the number of encoding passes for the low high band sub-band LH2 is 19, the maximum value of the number of encoding passes for the high low band sub-band HL2 is 19 and the maximum value of the number of encoding passes for the highest band sub-band HH2 is 18. At the first division stage, on the other hand, the maximum value of the number of encoding passes for the low high sub-band LH1 is 12, the maximum value of the number of encoding passes for the high low sub-band HL1 is 12 and the maximum value of the number of encoding passes for the highest sub-band HH1 is 7.

It is obvious that the upper limits of encoding-pass counts of type A, which are shown in FIG. 9, are smaller than those for the lossless processing shown in FIG. 8 for all sub-bands. Thus, for type A, the quantity of generated encoded data is smaller.

Figure 10:
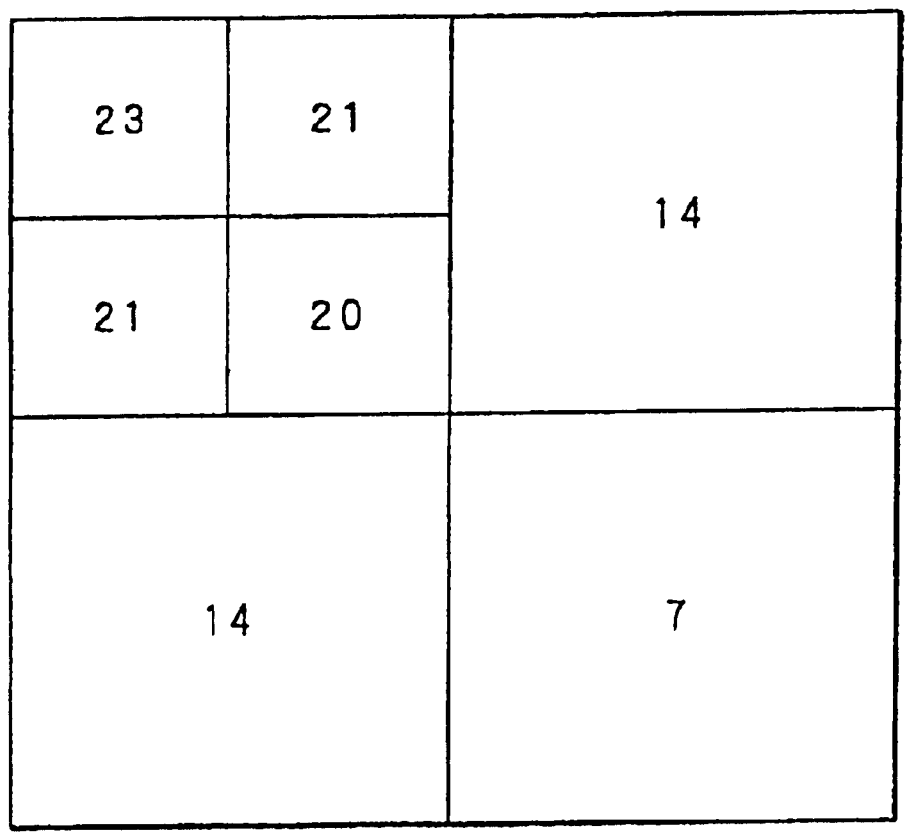
FIG. 10 is a diagram showing upper limits of encoding-pass counts of another type with two wavelet division stages.
Figure 11:
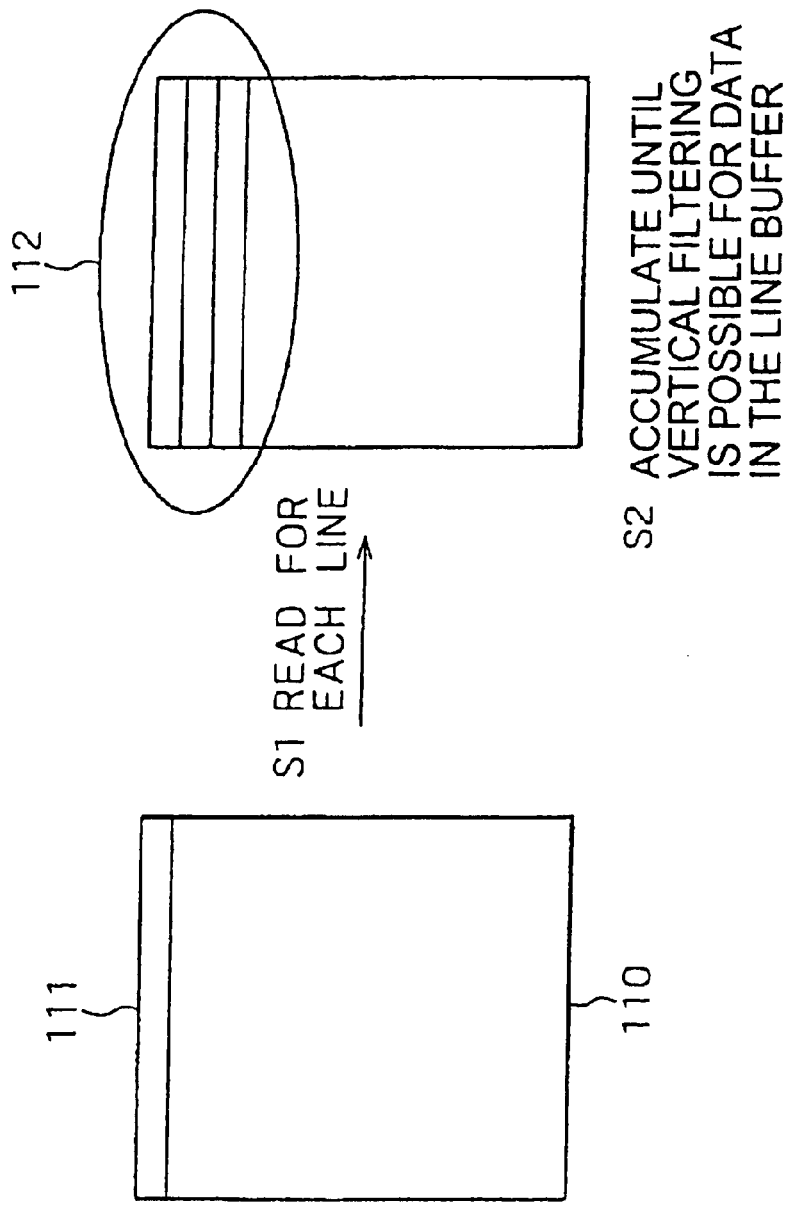
FIG. 11 is a diagram showing Part I of wavelet-transformation processing.

FIG. 10 is a diagram showing upper limits of encoding-pass counts of type B.

As shown in the figure, at the second division stage, the maximum value of the number of encoding passes for the lowest band sub-band LL2 is 23, the maximum value of the number of encoding passes for the low high band sub-band LH2 is 21, the maximum value of the number of encoding passes for the high low band sub-band HL2 is 21 and the maximum value of the number of encoding passes for the highest band sub-band HH2 is 20. At the first division stage, on the other hand, the maximum value of the number of encoding passes for the low high sub-band LH1 is 14, the maximum value of the number of encoding passes for the high low sub-band HL1 is 14 and the maximum value of the number of encoding passes for the highest sub-band HH1 is 7.

As a whole, the number of encoding passes for type B shown in FIG. 10 is greater than that for type A shown in FIG. 9. Since generation of encoded data for type B is more permitted than type A, the encoded-data quantity increases. Claim 8 describes means for switching the pattern of encoding-pass counts from one type to another.

In the operations described above, the bit-plane encoding-pass-generating unit 2 for generating encoding passes for each bit-plane selects encoding passes S102 for each bit-plane. The encoding passes S102 call the arithmetic encoding unit 3, which generates an arithmetic code signal S103. The remaining operations are the same as the first embodiment.

Fourth Embodiment

In the case of the third embodiment, upper limits stored in advance in the encoding-pass table 7 are used for limiting their respective encoding-pass counts for each sub-band. An encoding-pass-limiting means employed in the rate control unit 4 thereby controls the encoded-data quantity. Since the encoding-pass-limiting means executes the control in encoding-path units to the bitter end, however, the third embodiment is not sufficient in that it is not capable of executing control of the encoded-data quantity with a high degree of precision.

In order to solve this problem, there is provided an additional means functioning as an encoded-code-stream-truncating means, which is used for truncating an encoded-code stream when a result of an operation carried out by the rate control unit 4 to monitor the amount of information included in the arithmetic-code signal S103 indicates that the monitored amount of information exceeds a target encoded-data quantity. By truncating the encoded-code stream as such, the monitored amount of information never exceeds the target encoded-data quantity. In this way, it is possible to execute control of the encoded-data quantity with a high degree of precision. Details of this technique are described in claim 4 of this specification.

Fifth Embodiment

In the case of the fourth embodiment, upper limits stored in advance in the encoding-pass table 7 are used for limiting their respective encoding-pass counts for each sub-band, and control of the encoded-data quantity is executed by using an encoded-code-stream-truncating means for truncating an encoded-code stream when the number of encoding passes exceeds its upper limit. If there is a number of input pictures of various kinds, however, it is necessary to provide a plurality of encoding-pass tables each used for storing a pattern of encoding-pass counts each associated with a sub-band. In this case, a switching means is required as an effective means for changing the pattern from one table to another. With such a switching means, it is possible to carry out an encoding process while controlling the encoded-data quantity all the time. This scheme is described in claim 5 of this specification.

Sixth Embodiment

This embodiment is a typical application of the fifth embodiment. If the input picture is a moving picture, which can be treated as a sequence of consecutive static pictures, the encoding process can be complex and the encoded-data quantity can be large or the encoding process can be simple and the encoded-data quantity can be small in dependence on the picture as described earlier. It is thus unwise to determine encoding-pass counts by referring to only one encoding-pass pattern, which is stored in one encoding-pass table.

Therefore, by selecting one of a plurality of encoding-pass patterns like those shown in FIGS. 8 to 10 in dependence on the amount of data encoded in the past or in dependence on the characteristics of the present picture, the encoded-data quantity can be controlled with a high degree of effectiveness. In the case of this embodiment, an encoding-pass pattern is selected in dependence on the amount of data encoded immediately before. To put it concretely, the amount of data encoded immediately before is saved and, if this stored amount of data exceeds a picture encoded-data quantity per frame determined in advance or exceeds an amount of encoded data allocated to the frame, control is executed on a picture to be encoded at the present time in a direction to reduce the amount of encoded data generated in the encoding process.

Thus, a select means selects an encoding-pass table that will reduce the amount of encoded data generated in the encoding process among a plurality of encoding-pass tables each provided for storing an encoding-pass pattern. The selected encoding-pass table is then referred to in the control of the encoded-data quantity. It should be noted that each encoding-pass table is used for storing upper limits of encoding-pass counts. It is thus needless to say that, the more the encoding-pass tables provided for storing encoding-pass patterns finely different from each other, the finer the control that can be executed. In this case, however, a larger storage capacity is required for storing a larger number of encoding-pass tables. Therefore, the number of encoding-pass tables is determined by considering a tradeoff between the fineness of the control and the storage capacity.

Conversely speaking, if the stored amount of data encoded immediately before is lower than the picture encoded-data quantity per frame determined in advance or lower than the amount of encoded data allocated to the frame, control is executed on a picture to be encoded at the present time in a direction to increase the amount of encoded data generated in the encoding process. In this case, select means needs to select an encoding-pass table that will increase the amount of encoded data generated in the encoding process.

Seventh Embodiment

This embodiment is another typical application of the fifth embodiment. In the case of the seventh embodiment, if the input picture is a moving picture, an encoding-pass table is selected in dependence on characteristics of a picture being encoded at the present time. To put it concretely, for example, a sum of the absolute values of wavelet-transformation coefficients is found. Then, a threshold-based determination means determines that the amount of generated information is large if the sum exceeds a predetermined threshold value. For a large amount of generated information, an encoding-pass table that will reduce the amount of encoded data generated in the encoding process is selected. In this case, the input picture can be divided into some partial areas and a sum of variance values of pixels in these areas may be found to be compared with a threshold value. If the sum of variance values is greater than the threshold value, a fine texture is determined to exist. Since a fine texture will result in a large encoded-data quantity, an encoding-pass table that will decrease the amount of encoded data generated in the encoding process is selected.

Conversely speaking, if the sum of variance values is smaller than the threshold value, a coarse texture is determined to exist. In this case, since the encoded-data quantity is small, an encoding-pass table that will increase the amount of encoded data generated in the encoding process is selected. It should be noted that, since these pieces of processing are each normally processing of comparison with a threshold value, some variance-value thresholds are determined in advance and an encoding-pass table is selected in dependence on the result of comparison of a sum of variance values with an appropriate threshold value by means of the threshold-based determination means.

Eighth Embodiment

Figure 3:
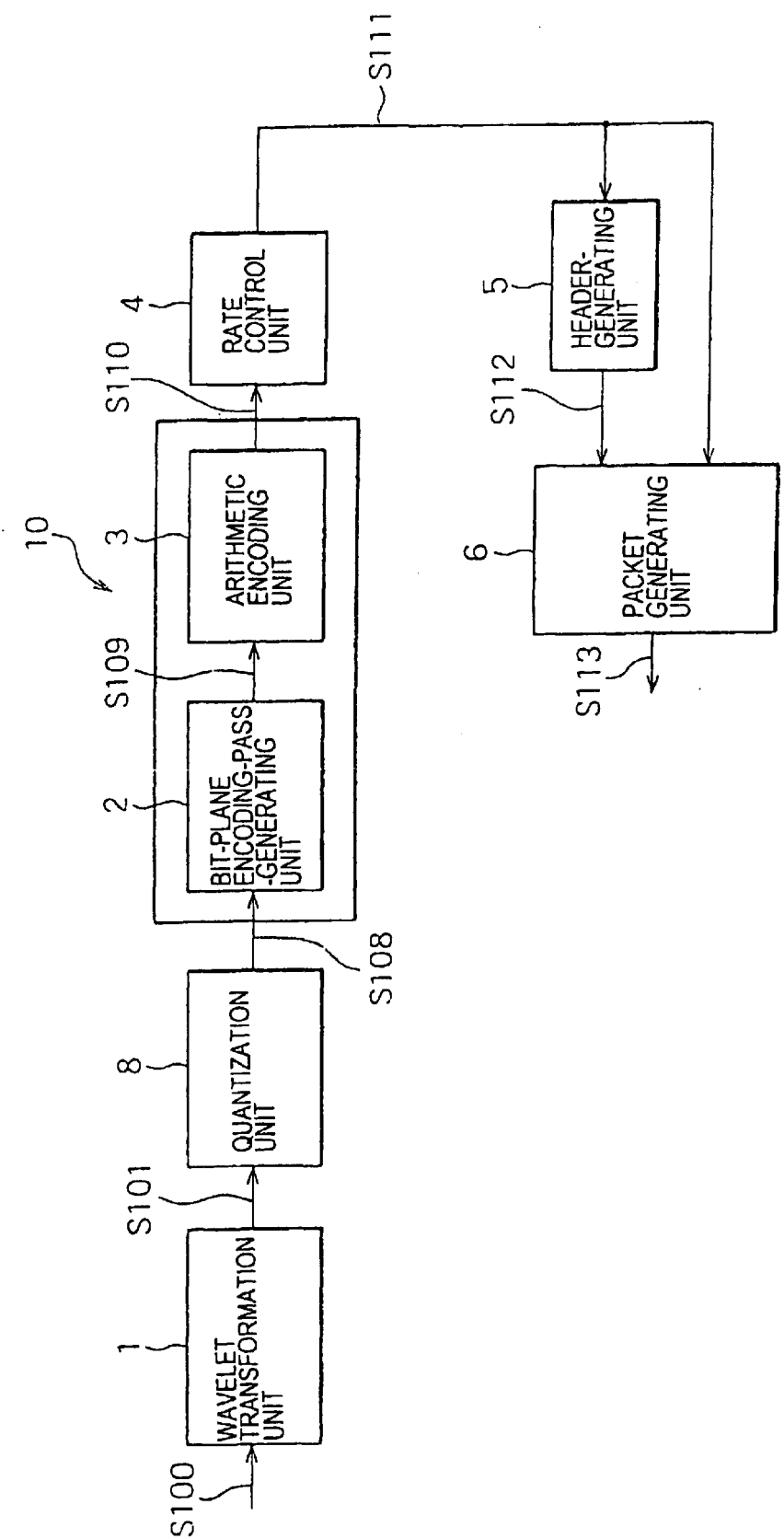
FIG. 3 is a block diagram showing the configuration of a picture-encoding apparatus implemented by a further embodiment of the present invention.

In the embodiments described so far, post-wavelet-transformation transformation coefficients are spread on bit-planes. In the case of an eighth embodiment, a quantization unit 8 is provided between the wavelet transformation unit 1 and the bit-plane encoding-pass-generating unit 2 as shown in FIG. 3. In such a configuration, a wavelet-transformation coefficient S101 is quantized in the quantization unit 8 to generate a quantized coefficient S108.

As a quantization means, scalar quantization is normally adopted. The scalar quantization divides a wavelet-transformation coefficient S101 by a quantization step size. It should be noted that the JPEG-2000 standard also prescribes this quantization technique. A quantization means for quantizing a wavelet-transformation coefficient S101 is described in claim 11 of this specification.

The bit-plane encoding-pass-generating unit 2 spreads quantized coefficients S108 on bit-planes and generates encoding passes for each code block in the same way as the first embodiment. Since the absolute value of a quantized coefficient S108 generated by the quantization means is smaller than the absolute value of a wavelet-transformation coefficient S101, the eighth embodiment is characterized in that the number of bit-planes for spreading the quantized coefficients S108 is smaller than the number of bit-planes in the other embodiments.

From an encoding pass S109 generated for each code block generated on a bit-plane, the arithmetic encoding unit 3 is called if necessary to generate an arithmetic code signal S110. The remaining operations are the same as the other embodiments.

It should be noted that, if the quantization means is used for carrying out quantization to result in encoding-pass counts for each sub-band like those shown in FIG. 9 or 10, the same objectives as the other embodiments can of course be achieved. In this case, it is possible to eliminate the means for generating encoding passes from the bit-plane encoding-pass-generating unit 2.

Ninth Embodiment

The wavelet transformation means employed in the first embodiment orients the low-band and high-band filters in the horizontal and vertical directions and carries out filtering repeatedly till a plurality of sub-bands is obtained. However, a means for carrying out wavelet transformation on the entire screen needs to save as many transformation coefficients as pixel samples on the entire screen. For this reason, such a means becomes unrealistic for an input picture with a large size. Thus, a line buffer is used for holding the required minimum portion of a picture or its coefficients. With such a line buffer, while wavelet transformation is being carried out repeatedly, a filtering means inputs pixel samples required in the filtering from time to time.

Normally, a filter used in wavelet-transformation filtering is a filter of a plurality of taps. If as many lines as required in the wavelet-transformation filtering are stored, the filtering process can be carried out immediately.

FIGS. 11 to 14 are diagrams showing concrete operations of the wavelet-transformation processing and the wavelet-division processing in the line-base wavelet-transformation processing. First of all, at a step S1 shown in FIG. 11, a data line 111 of an input picture 110 is read out for each line, and the data line is stored in a line buffer 112 serving as a data read memory means. At a step 2, the operations to read out and store a data line 111 are carried out repeatedly one line after another till sufficient data is stored in the line buffer 112 and vertical filtering can thus be carried out on the data.

Figure 12:
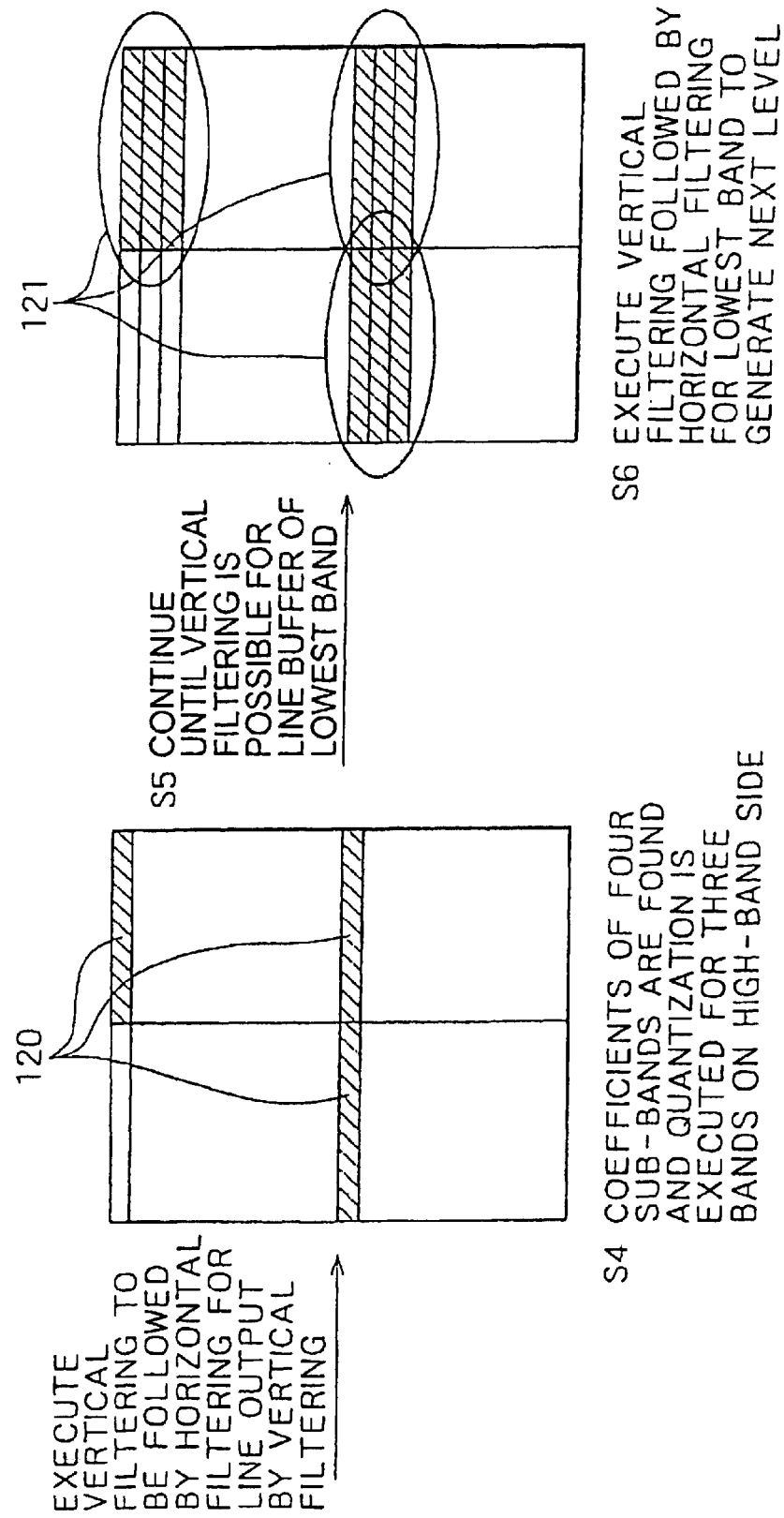
FIG. 12 is a diagram showing Part II of the wavelet-transformation processing.

At a step S3 shown in FIG. 12, when as many data lines as required in the vertical filtering of the wavelet transformation have been stored in the line buffer 112, the vertical filtering is carried out to be followed by horizontal filtering. At this point of time, wavelet-transformation coefficient values for the four sub-bands LL2, LH2, HL2 and HH2 at the second division stage on the low-band side have been determined. At a step S4, sub-band coefficients 120 each serving as an object of quantization are subjected to quantization for the three sub-bands LH1, HL1 and HH1 at the first division stage on the high-band side. As a result, quantized sub-band coefficient lines 121 are generated.

At a step S5, the wavelet-transformation coefficients of the lowest band sub-band LL2 are again stored in the line buffer 112. The operation to store the wavelet-transformation coefficients of the lowest band sub-band LL2 is carried out repeatedly till as many data lines as required in the vertical filtering are stored in the line buffer 112. As a result, the wavelet-transformation coefficients are stored in the line buffer 112, which serves as a buffer means. At a step S6, when as many data lines of the lowest sub-band LL2 as required in the vertical filtering have been stored in the buffer means, horizontal filtering following the vertical filtering is carried out in order to generate the next wavelet division stage.

As a result, since four wavelet coefficients 130 of the lowest sub-band LL2 at the second division stage are confirmedly obtained as shown in a left diagram of FIG. 13, at a step S7, quantization at the second stage is carried out immediately to generate quantization coefficients.

As described above, the operations to read out and store a data line 111 are carried out repeatedly at the steps S1 and S2 one line after another till sufficient data is stored in the line buffer 112 and vertical filtering can thus be carried out on the data. These operations are carried out for a case in which the number of division stages is 1. Also as described above, the operation to store the wavelet-transformation coefficients of the lowest band sub-band LL2 is carried out at the step S5 repeatedly till as many data lines as required in the vertical filtering are stored in the line buffer 112. These operations are carried out for a case in which the number of division stages is 2. In either case, it is necessary to store data in the buffer 112. At that time, wavelet-transformation coefficients are supplied sequentially to the buffer 112 in line units at each division stage to be stored therein.

In the vertical filtering carried out at the step S3 or S6, on the other hand, wavelet-transformation coefficients of some lines required in the vertical filtering are read out from the buffer 112 to be subjected to the vertical filtering. The above operations are continued till processing at all division stages is completed.

At a point of time a line count 131 of the quantized coefficients for the sub-bands LH1, HL1 and HH1 at the first division stage on the high-band side reaches the height (H) of a unit of the code-block entropy encoding process, the EBCOT processing is carried out as the entropy-encoding process at a step S8. In the case of the embodiment in particular, the unit of the code-block entropy encoding process is a block serving as a unit of the EBCOT processing prescribed in the JPEG-2000 standard.

By the same token, at a point of time a line count 140 of the quantized coefficients for the sub-band LL2 at the second division stage on the low-band side reaches the height (H) of a unit of the EBCOT processing to be carried out as a code-block entropy encoding process of a block base, the EBCOT processing is carried out at a step S9 shown in FIG. 14. It should be noted that, for the sub-bands LH1, HL1 and HH1 at the first division stage on the high-band side, reference numeral 141 denotes quantized coefficients completing the EBCOT processing.

By carrying out the operations described above till processing at a required wavelet division stage is done, the wavelet transformation processing, quantization and the entropy encoding process for all pictures are completed.

Tenth Embodiment

In the embodiments described earlier, from an encoding pass in a bit-plane generated by the bit-plane encoding-pass-generating unit 2, the arithmetic encoding unit 3 is called to carry out an operation to generate arithmetic codes. In this case, a measurement of statistics of arithmetic codes is continued to an adjacent encoding pass. As a result, the encoding efficiency can be improved. If the independence of an encoding pass is to be taken into consideration, however, a measurement-terminating means for terminating a measurement of statistics can be used for ending a measurement of statistics of arithmetic codes for each encoding pass.

In this case, since the amount of code generated for each encoding pass can be recorded in a packet header, there is offered a merit of a simple processing procedure in comparison with a case in which a sum of amounts of code generated for a plurality of encoding passes is computed and the computed sum is stored. In this way, for a bit-plane, as many packets as encoding passes can be created. Thus, a layer-structuring means can be used for forming a multi-packet layer structure to allow applications to error countermeasures. In addition, it is also possible to implement a progressive function that can be applied to wireless communication and conforms to the JPEG-2000 standard.

In accordance with the embodiments described above, it is possible to implement an encoding apparatus and an encoding means, which are used for generating an encoded-code stream conforming to the JPEG-2000 standard. In addition, it is also possible to exhibit an effect of efficiently implementing an encoded-data-quantity control means, which was not given much attention so far due to its inconformity with the conventional standards. Moreover, there is also exhibited an effect of high-speed encoding due to an effect of reduction of a computation load borne during control of the encoded-data quantity in comparison with a means, which takes a rate distortion characteristic into consideration. As a result, the present invention has an effect of a capability of encoding more moving-picture frames per unit time.

What is claimed is:

1. A picture-encoding apparatus for generating a packet of an encoded-code stream having a predetermined format, said picture-encoding apparatus comprising:

filtering means for orienting low-band and high-band filters for an input picture in vertical and horizontal directions to generate coefficients;

bit-plane-generating means for spreading said coefficients generated by said filtering means over bit-planes ranging from an MSB (most significant bit) bit-plane to an LSB (least significant bit) bit-plane;

encoding-pass-generating means for generating encoding passes for each of said bit-planes;

an arithmetic encoding unit for carrying out an arithmetic encoding process in each of said encoding passes to generate arithmetic code;

encoded-data-quantity control means for controlling an encoded-data quantity so as to achieve a target encoded-data quantity for said generated arithmetic code;

a packet-generating unit for generating said packet by addition of a header to said arithmetic code experiencing control of said encoded-data quantity executed by said encoded-data quantity control means; and encoded-code-stream-truncating means for truncating said encoded-code stream completing processing through all said encoding passes by discarding a rear portion of said encoded-code stream so as to make an encoded-data quantity of said encoded-code stream equal to a target encoded-data quantity.

2. A picture-encoding apparatus according to claim 1, wherein said encoding-pass-generating means for generating encoding passes for each of said bit-planes carries out:

an encoding process in block units each having a predetermined size so that said block units are processed independently of each other; and no measurement of arithmetic-encoding statistics crossing boundaries of said block units.

3. A picture-encoding apparatus according to claim 1, wherein, between a stage following said filtering means and a stage preceding said encoding-pass-generating means for generating encoding passes for each of said bit-planes, a quantization means for quantizing a filter coefficient of a sub-band is provided.

4. The picture-encoding apparatus according to claim 3, said picture-encoding apparatus further comprising an encoded-code-stream-truncating means, which is used for truncating said encoded-code stream generated by said encoding-pass-generating means by discarding a rear portion of said encoded-code stream so as to make an encoded-data quantity of said encoded-code stream equal to a target encoded-data quantity in case said encoded-data quantity of said encoded stream exceeds said target encoded-data quantity.

5. The picture-encoding apparatus according to claim 3, said picture-encoding apparatus further comprising:

a storage means for storing a plurality of patterns of encoding-pass counts for each sub-band; and memory; and a switching means for selecting one of said pattern in dependence on an input picture.

6. The picture-encoding apparatus according to claim 5, wherein, for an input picture consisting of a sequence of consecutive moving pictures, said switching means for selecting one of said patterns of encoding-pass counts for each sub-band;

selects one of said patterns, which makes encoded code difficult to generate, if the amount of code generated for a frame encoded immediately before is greater than a target encoded-data count; but selects one of said patterns, which makes encoded code easy to generate, if the amount of code generated for said frame encoded immediately before is smaller than said target encoded- data count.

7. The picture-encoding apparatus according to claim 5, wherein said switching means for selecting one of said patterns of encoding-pass counts for each sub- band has a threshold-based determination means for selecting one of said patterns in dependence on a result of comparison of a characteristic extracted froma frame encoded at the present time with a predetermined threshold value for an input consisting of a sequence of consecutive moving pictures.

8. The picture-encoding apparatus according to claim 5, said picture-encoding apparatus further comprising a setting means, which is used for setting said patterns of encoding-pass counts for each sub-band so that:

any one of said patterns to be selected by said switching means so as to make encoded code easy to generate comprises large encoding-pass counts for sub-band; and independently of each other; and any one of said patterns to be selected by said switching means so as to make encoded code difficult to generate comprises small encoding-pass counts for said sub-band.

9. The picture-encoding apparatus according to claim 1, wherein said encoding-pass-generating means for generating encoding passes for each of said bit-planes carries out:

an encoding process in block units each having a predetermined size so that said block units are processed independently of each other; and no measurement of arithmetic-encoding statistics crossing boundaries of said block units. means for generating encoding passes for each 10. The picture-encoding apparatus according to claim 2, wherein said encoding-pass-generating means for generating encoding passes for each of said bit-planes carries out:

an encoding process in block units each having a predetermined size so that said block units are processed independently of each other; and no measurement of arithmetic-encoding statistics crossing boundaries of said block units.

11. The picture-encoding apparatus according to claim 3, wherein said encoding-pass-generating means for generating encoding passes for each of said bit-planes carries out:

an encoding process in block units each having a predetermined size so that said block units are processed independently of each other; and no measurement of arithmetic-encoding statistics crossing boundaries of said block units.

12. The picture-encoding apparatus according to claim 1, wherein, between a stage following said filtering means and a stage preceding said encoding- pass-generating means for generating encoding passes for each of said bit-planes, a quantization means for quantizing a filter coefficient of a sub-band is provided.

13. The picture-encoding apparatus according to claim 2, wherein, between a stage following said filtering means and a stage preceding said encoding- pass-generating means for generating encoding passes for each of said bit-planes, a quantization means for quantizing a filter coefficient of a sub-band is provided.

14. The picture-encoding apparatus according to claim 3, wherein, between a stage following said filtering means and a stage preceding said encoding- pass-generating means for generating encoding passes for each of said bit-planes, a quantization means for quantizing a filter coefficient of a sub-band is provided.

15. The picture-encoding apparatus according to claim 12 wherein said quantization means is implemented as a means for dividing a wavelet- transformation coefficient of a generated sub-band by a solar quantization step size.

16. The picture-encoding apparatus according to claim 13, wherein said quantization means is implemented as a means for dividing a wavelet- transformation coefficient of a generated sub-band by a scalar quantization step size.

17. The picture-encoding apparatus according to claim 14, wherein said quantization means is implemented as a means for dividing a wavelet- transformation coefficient of a generated sub-band by a scalar quantization step size.

18. The picture-encoding apparatus according to claim 1, wherein said filtering means is implemented as a means comprising:

storage means for reading out a predetermined area of a picture and storing and predetermined area in a memory; and filtering-operation means, which is used for applying filtering operations in horizontal and vertical directions to said stored area of said picture as soon as said area of said picture is stored by said storage means in said memory.

19. The picture-encoding apparatus according to claim 2, wherein said filtering means is implemented as means comprising:

storage means for reading out a predetermined area of a picture and storing said predetermined area in a memory; and vertical directions to said stored area of said picture as soon as said area picture is stored by said storage in said memory.

20. The picture-encoding apparatus according to claim 3, wherein said filtering means is implemented as a means comprising:

storage means for reading out a predetermined area of a picture and storing said predetermined area in a memory; and filtering-operation means, which is used for applying filtering operations in horizontal and vertical directions to said stored area of said picture as soon as said area of said picture is stored by said storage means in said memory.

21. The picture-encoding apparatus according to claim 1, wherein said encoding-pass-generating means for generating encoding passes for each of said bit-planes comprises:

measurement-ending for ending a measurement of statistics by said arithmetic encoding unit for each of said encoding passes; and layer-structurizing means for forming a layer structure of each of said bit-planes.

22. The picture-encoding apparatus according to claim 2, wherein said encoding-pass-generating means for encoding passes for each of said bit-planes comprises:

measurement-ending means for ending a measurement of statistics by said arithmetic encoding unit for each of said encoding passes; and layer-structurizing means for forming a layer struture of each of said bit-planes.

23. The picture-encoding apparatus according to claim 3, wherein said encoding-pass-generating means for generating encoding passes for each of said bit-planes comprises:

measurement-ending means for ending a measurement of statistics by said arithmetic encoding unit for each of said encoding passes; and layer-structurizing means for forming a layer structure of each of said bit-planes.

* * * * *

UNITED STATES PATENT AND TRADEMARK OFFICE
CERTIFICATE OF CORRECTION

PATENT NO. : 6,876,772 B2
DATED : April 5, 2005
INVENTOR(S) : Takahiro Fukuhara

It is certified that error appears in the above-identified patent and that said Letters Patent is hereby corrected as shown below:

<u>Column 15,</u>
Lines 32-44, should be deleted and should read as follows:

2. A picture-encoding apparatus for generating a packet of an encoded-code stream having a predetermined format, said picture-encoding apparatus comprising:
    filtering means for orienting low-band and high-band filters for an input picture in vertical and horizontal directions to generate coefficients;
    bit-plane-generating means for spreading said coefficients generated by said filtering means over bit-planes ranging from an MSB (most significant bit) bit-plane to an LSB (least significant bit) bit-plane;
    encoding-pass-generating means for generating encoding passes for each of said bit-planes;
    an arithmetic encoding unit for carrying out an arithmetic encoding process in each of said encoding passes to generate arithmetic code;
    encoded-data-quantity control means for controlling an encoded-data quantity so as to achieve a target encoded-data quantity determined in advance for said generated arithmetic code; and
    a packet-generating unit for generating said packet by addition of a header to said arithmetic code experiencing control of said encoded-data quantity executed by said encoded-data quantity control means,
    wherein said encoding-pass-generating means employs encoding-process-stopping means, which is used for stopping an encoding process at a point of time said target encoded-data quantity is attained.
    3. A picture-encoding apparatus for generating a packet of an encoded-code stream having a predetermined format, said picture-encoding apparatus comprising:
    filtering means for orienting low-band and high-band filters for an input picture in vertical and horizontal directions to generate coefficients;
    bit-plane-generating means for spreading said coefficients generated by said filtering means over bit-planes ranging from an MSB (most significant bit) bit-plane to an LSB (least significant bit) bit-plane;
    encoding-pass-generating means for generating encoding passes for each of said bit-planes;
    an arithmetic encoding unit for carrying out an arithmetic encoding process in each of said encoding passes to generate arithmetic code;
    encoded-data-quantity control means for controlling an encoded-data quantity so as to achieve a target encoded-data quantity determined in advance for said generated arithmetic code;
    a packet-generating unit for generating said packet by addition of a header to said arithmetic code experiencing control of said encoded-data quantity executed by said encoded-data quantity control means; and
    storage means for storing a maximum encoding-pass count for each sub-band generated by said filtering means,
    wherein said encoding-pass-generating means employs an encoding-pass-ending means, which is used for stopping generation of said encoding passes at a point of time the number of encoding passes reaches a predetermined encoding-pass count.

UNITED STATES PATENT AND TRADEMARK OFFICE
CERTIFICATE OF CORRECTION

PATENT NO. : 6,876,772 B2
DATED : April 5, 2005
INVENTOR(S) : Takahiro Fukuhara

It is certified that error appears in the above-identified patent and that said Letters Patent is hereby corrected as shown below:

Column 15 (cont'd),
Line 57, "sub- band; and memory;" should read -- sub-band --.
Line 59, "pattern" should read -- patterns --.

Column 16,
Line 6, "encoded- data" should read -- encoded-data --.
Line 9, "sub- band" should read -- sub-band --.
Line 12, "froma" should read -- from a --.
Line 22, "and independently of each other; and" should read -- and --.
Line 34, "units. Means for generating" should read -- units. --.
Line 35, "encoding passes for each" should be deleted.
Lines 54, 60, and 66, "encoding- pass-generating" should read -- encoding-pass-generating --.

Column 17,
Lines 3, 7 and 11, "wavelet- transformation" should read -- wavelet-transformation --.
Line 4, "solar" should read -- scalar --.
Line 17, "and predetermined" should read -- said predetermined --.

Signed and Sealed this

Twenty-seventh Day of September, 2005

JON W. DUDAS
*Director of the United States Patent and Trademark Office*